United States Patent
Hall et al.

(10) Patent No.: US 11,725,693 B2
(45) Date of Patent: Aug. 15, 2023

(54) OFFSET COMPOUND BEARING ASSEMBLY

(71) Applicant: Accessible Technologies, Inc., Lenexa, KS (US)

(72) Inventors: Cliff Hall, Lee's Summit, MO (US); Daniel Rosner, Olathe, KS (US)

(73) Assignee: Accessible Technologies, Inc., Lenexa, KS (US)

( * ) Notice: Subject to any disclaimer, the term of this patent is extended or adjusted under 35 U.S.C. 154(b) by 0 days.

(21) Appl. No.: 17/573,411

(22) Filed: Jan. 11, 2022

(65) Prior Publication Data

US 2023/0220883 A1 Jul. 13, 2023

(51) Int. Cl.
*F16C 19/55* (2006.01)
*F16C 33/38* (2006.01)
*F16C 33/66* (2006.01)
*F16C 33/44* (2006.01)
*F16C 33/32* (2006.01)
*F16C 33/58* (2006.01)

(52) U.S. Cl.
CPC .......... *F16C 33/6681* (2013.01); *F16C 19/55* (2013.01); *F16C 33/32* (2013.01); *F16C 33/385* (2013.01); *F16C 33/3887* (2013.01); *F16C 33/44* (2013.01); *F16C 33/581* (2013.01); *F16C 2204/42* (2013.01); *F16C 2206/40* (2013.01); *F16C 2360/24* (2013.01)

(58) Field of Classification Search
CPC ........ F16C 19/55; F16C 33/32; F16C 33/385; F16C 33/3887; F16C 33/44; F16C 33/581; F16C 33/6681; F16C 2204/42; F16C 2206/40; F16C 2360/24
See application file for complete search history.

(56) References Cited

U.S. PATENT DOCUMENTS

| | | | | |
|---|---|---|---|---|
| 3,737,202 A * | 6/1973 | Rosales | ............... | F16C 19/55 384/461 |
| 6,651,633 B1 * | 11/2003 | Jones | ............... | F02B 39/06 123/559.1 |
| 7,299,792 B1 * | 11/2007 | Jones | ............... | F02B 39/14 184/6.12 |
| 8,356,586 B2 | 1/2013 | Roderique | | |
| 2007/0116395 A1 * | 5/2007 | Toyoda | ............... | F16C 33/414 384/533 |
| 2009/0081040 A1 * | 3/2009 | Ueno | ............... | F16C 19/55 415/229 |
| 2017/0191527 A1 * | 7/2017 | Krebs | ............... | F16C 33/3887 |

FOREIGN PATENT DOCUMENTS

CN 113062925 A * 7/2021
DE 102014205971 A1 * 10/2015 .............. F16C 33/44

* cited by examiner

*Primary Examiner* — Phillip A Johnson
(74) *Attorney, Agent, or Firm* — Erise IP, P.A.

(57) ABSTRACT

Systems and methods are provided for a compound bearing assembly including an offset coupler supporting an inner bearing and an outer bearing for distributing a rotational loading of the compound bearing assembly. In some embodiments, at least one of the bearings comprises a bearing cage with a plurality of elongated openings for receiving a respective plurality of balls. The compound bearing assembly is configured to support a drive shaft of a supercharger system of a vehicle or some other rotational system.

20 Claims, 7 Drawing Sheets

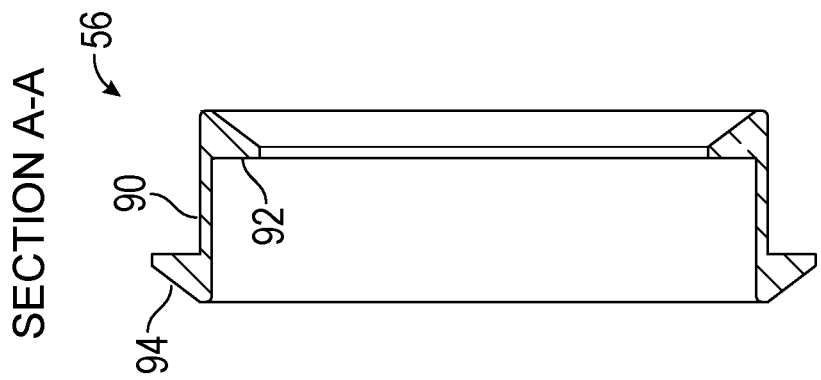
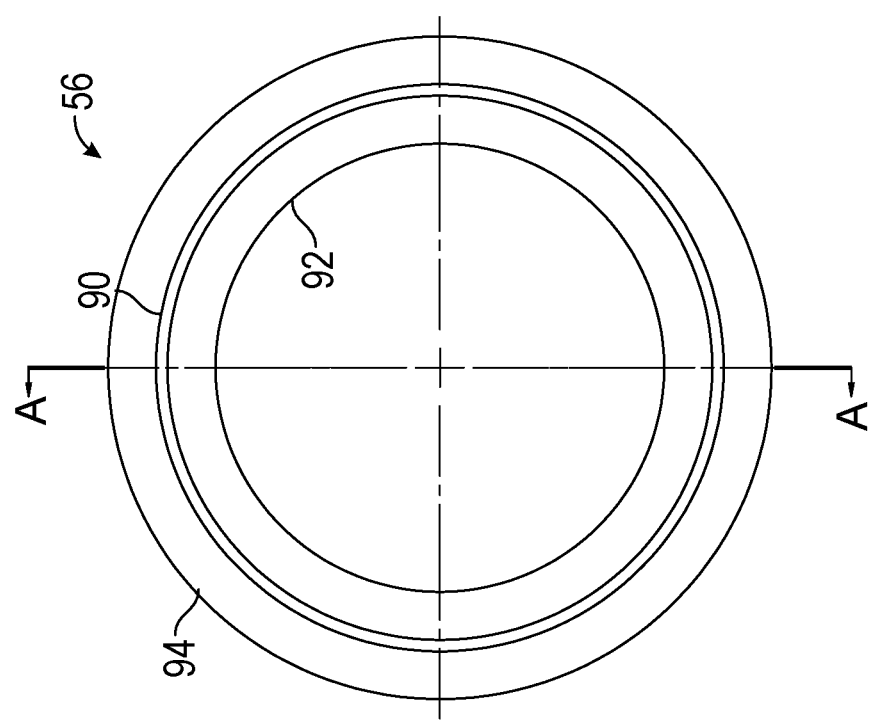
FIG. 5B
FIG. 5A

OFFSET COMPOUND BEARING ASSEMBLY

BACKGROUND

1. Field

Embodiments of the invention relate to bearing assemblies. More specifically, embodiments of the invention relate to offset compound bearing assemblies.

2. Related Art

Compound bearing systems typically include two or more concentric bearings in which each of the bearings are centered with respect to one another to absorb a rotational load and distribute speed. However, the concentric design fails to evenly distribute the axial load. Accordingly, the inner central bearing typically receives a larger portion of the load which leads to increased wear and early failure.

As such, existing compound bearing assemblies are not suited for high-speed rotational systems, such as supporting a drive shaft within a supercharger system of a vehicle that is associated with high-speed rotational loads and axial loads experienced over short periods of time. Additionally, typical bearing systems are not suited to withstand the amount of generated heat associated with high-speed operation, which leads to overheating.

SUMMARY

Embodiments of the invention solve the above-mentioned problems by providing a compound bearing assembly including an offset coupler supporting an inner bearing and an outer bearing for distributing a rotational and axial load of the compound bearing assembly. In some embodiments, at least one of the bearings comprises a bearing cage with a plurality of elongated elliptical holes for receiving a respective plurality of balls.

In some aspects, the techniques described herein relate to a compound bearing assembly for supporting a drive shaft within a vehicle supercharger system, the drive shaft extending along a longitudinal axis, the compound bearing assembly including: an inner bearing surrounding the drive shaft, the inner bearing including: an inner bearing inner race; an inner bearing outer race surrounding the inner bearing outer race; an inner bearing cage including a plurality of elongated openings for allowing oil flow within the inner bearing; and a plurality of inner bearing balls disposed within the respective plurality of elongated openings of the inner bearing cage; an outer bearing including: an outer bearing inner race; an outer bearing outer race adapted to be coupled to a frame of the vehicle supercharger system; an outer bearing cage; and a plurality of outer bearing balls disposed within the outer bearing cage; and an offset coupler coupled to each of the inner bearing and the outer bearing, the offset coupler supporting the inner bearing outer race and the outer bearing inner race, wherein the offset coupler positions the inner bearing and the outer bearing such that the outer bearing is offset along the longitudinal axis with respect to the inner bearing to distribute a load from the drive shaft and impeller, and to provide an oil flow path between the inner bearing and the outer bearing.

In some aspects, the techniques described herein relate to a compound bearing assembly, wherein the plurality of inner bearing balls, the plurality of outer bearing balls, or both include ceramic.

In some aspects, the techniques described herein relate to a compound bearing assembly, wherein the inner bearing cage, the outer bearing cage, or both include titanium.

In some aspects, the techniques described herein relate to a compound bearing assembly, wherein the offset coupler includes: an inner lip supporting the inner bearing; and an outer lip supporting the outer bearing.

In some aspects, the techniques described herein relate to a compound bearing assembly, wherein each of the plurality of elongated openings are offset about 1 degree from a center of each respective opening.

In some aspects, the techniques described herein relate to a compound bearing assembly, wherein the outer bearing cage includes a plurality of elongated openings for receiving the plurality of outer bearing balls.

In some aspects, the techniques described herein relate to a compound bearing assembly, wherein a rotational speed of each of the inner bearing and the outer bearing does not exceed an overall rotational speed of the drive shaft during operation.

In some aspects, the techniques described herein relate to a compound bearing assembly for supporting a drive shaft within a rotational system, the compound bearing assembly including: an inner bearing connected to the drive shaft, the inner bearing including: an inner bearing housing including an inner bearing inner race and an inner bearing outer race; an inner bearing cage disposed within the inner bearing housing, the inner bearing cage including a plurality of elongated elliptical openings for allowing oil flow within the inner bearing; and a plurality of inner bearing balls disposed within the inner bearing cage; an outer bearing including: an outer bearing housing including an outer bearing inner race and an outer bearing outer race adapted to be coupled to a frame of the rotational system; an outer bearing cage disposed within the outer bearing housing; and a plurality of outer bearing balls disposed within the outer bearing cage; and a coupler connecting the inner bearing to the outer bearing, the coupler secured to the inner bearing outer race and the outer bearing inner race.

In some aspects, the techniques described herein relate to a compound bearing assembly, wherein the drive shaft extends along a longitudinal axis, and the coupler is an offset coupler for positioning the inner bearing and the outer bearing such that the outer bearing is spaced along the longitudinal axis with respect to the inner bearing to distribute an axial load from the drive shaft.

In some aspects, the techniques described herein relate to a compound bearing assembly, wherein the coupler includes: a cylindrical central wall portion; an inner lip disposed at a first end of the central wall portion extending inwards for supporting the inner bearing; and an outer lip disposed at a second end of the central wall portion extending outwards for supporting the outer bearing.

In some aspects, the techniques described herein relate to a compound bearing assembly, wherein the coupler provides an oil flow path between the inner bearing and the outer bearing.

In some aspects, the techniques described herein relate to a compound bearing assembly, wherein the inner bearing cage, the outer bearing cage, or both include titanium.

In some aspects, the techniques described herein relate to a compound bearing assembly, wherein the plurality of inner bearing balls, the plurality of outer bearing balls, or both include ceramic.

In some aspects, the techniques described herein relate to a compound bearing assembly, configured to be used at high-speeds with the drive shaft of a supercharger system for a vehicle, wherein: the plurality of inner bearing balls and the plurality of outer bearing balls each include ceramic, the inner bearing cage, the outer bearing cage, or both include titanium.

In some aspects, the techniques described herein relate to a compound bearing assembly for supporting a drive shaft having a longitudinal axis within a rotational system, the compound bearing assembly including: an inner bearing coupled to the drive shaft, the inner bearing including: an inner bearing housing including an inner bearing inner race and an inner bearing outer race; an outer bearing including: an outer bearing housing including an outer bearing inner race and an outer bearing outer race configured to be coupled to a frame of the rotational system; and an offset coupler coupled to each of the inner bearing and the outer bearing, the offset coupler supporting the inner bearing outer race of the inner bearing and the outer bearing inner race of the outer bearing, wherein the offset coupler positions the inner bearing and the outer bearing such that the outer bearing is offset along the longitudinal axis with respect to the inner bearing to distribute an axial load from the drive shaft and to provide an oil flow path between the inner bearing and the outer bearing.

In some aspects, the techniques described herein relate to a compound bearing assembly, wherein the inner bearing further includes: an inner bearing cage disposed within the inner bearing housing, the inner bearing cage including a plurality of elongated openings for allowing oil flow within the inner bearing; and a plurality of inner bearing balls disposed within the inner bearing cage.

In some aspects, the techniques described herein relate to a compound bearing assembly, wherein the outer bearing further includes: an outer bearing cage disposed within the outer bearing housing, the outer bearing cage may also include a plurality of elongated openings; and a plurality of outer bearing balls disposed within the outer bearing cage.

In some aspects, the techniques described herein relate to a compound bearing assembly, wherein the inner bearing cage, the outer bearing cage, or both include titanium.

In some aspects, the techniques described herein relate to a compound bearing assembly, wherein the inner bearing balls, the outer bearing balls, or both include ceramic that is configured for high-speed use.

In some aspects, the techniques described herein relate to a compound bearing assembly, wherein each of the plurality of elongated openings of the inner bearing cage and the outer bearing cage are offset about 1 degree from a center of each respective opening.

Additional embodiments of the invention are directed to providing a bearing assembly including a bearing cage with a plurality of elongated elliptical holes for receiving a respective plurality of balls. The plurality of elongated elliptical holes is configured to reduce heating and provide an oil flow path through the bearing assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 5A depicts a top view of an offset coupler relating to some embodiments of the invention;

FIG. 5B depicts a cross-sectional view of an offset coupler relating to some embodiments of the invention;

Figure 1:
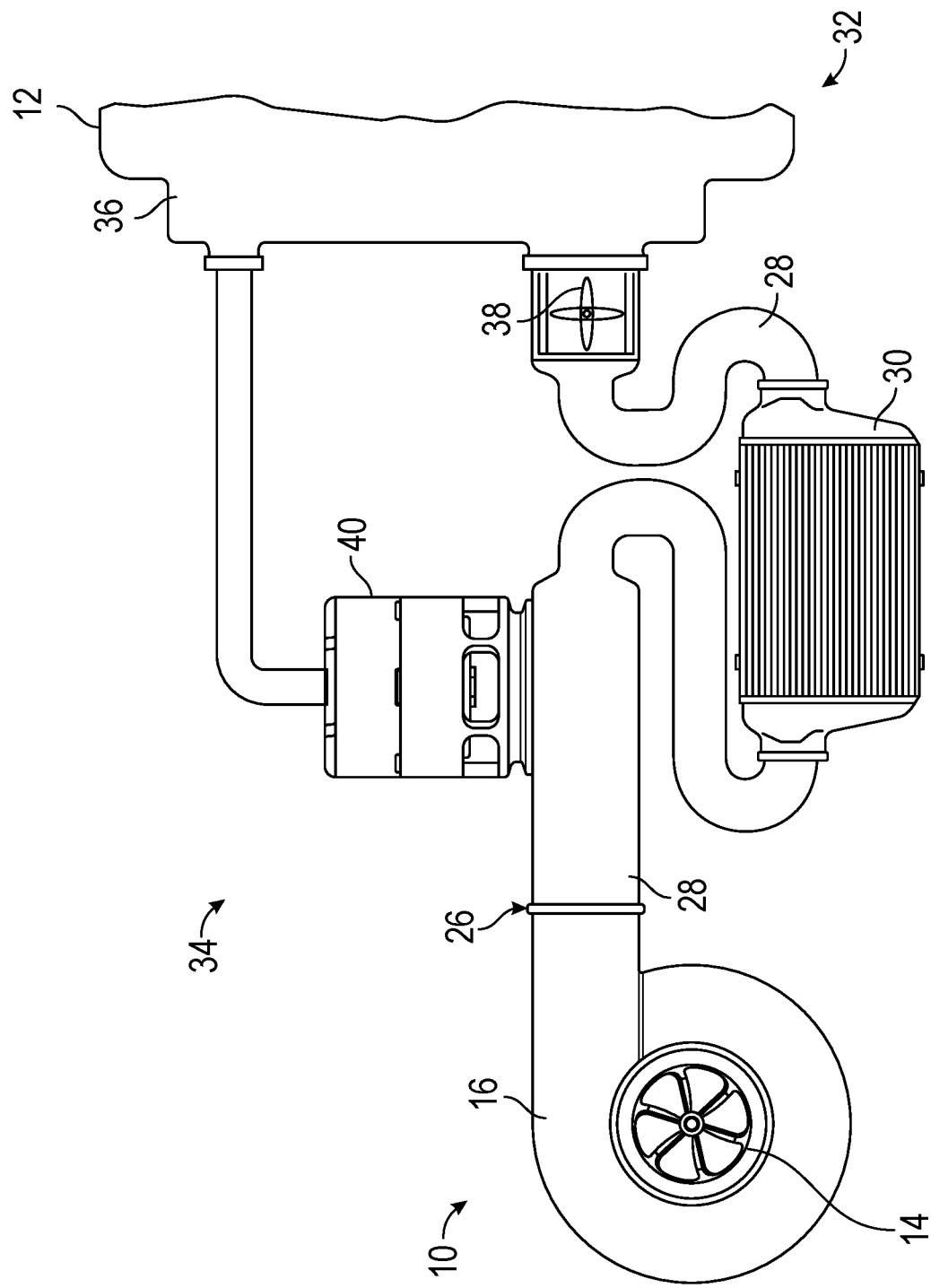
FIG. 1 depicts an exemplary supercharger system relating to some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary supercharger system 10 is depicted relating to some embodiments of the invention. In some embodiments, the supercharger system 10 may be integrated into a vehicle such as, for example, a car, truck, utility vehicle, marine vehicle, or aircraft. In some such embodiments, the supercharger system 10 may be integrated into a duct system 34 associated with an internal combustion engine 12, as shown, which may be an engine of the vehicle. As illustrated in FIG. 1, a compressor housing 16 directs air towards an air outlet 26. In some embodiments, the air is directed using an impeller 14 installed within the compressor housing 16, as shown.

In some embodiments, the air outlet 26 of the compressor housing 16 is secured to a duct 28, pipe, or the like. It should be appreciated that the duct system 34 as illustrated in FIG. 1 shows the duct system 34 in a schematic manner, but often the duct system 34 will be curved and angled to fit within a particular engine compartment. In some embodiments, the duct system 34 may run through an intercooler 30 to cool the air before it is fed into the internal combustion engine 12. The intercooler 30 may be adjacent to a grille of the vehicle such that entering air passes through the intercooler 30.

The duct system 34 contains the compressed air that is directed toward an engine manifold 36 or other component of the internal combustion engine 12. While a throttle 38 associated with the internal combustion engine 12 is open, compressed air from the duct system 34 is pushed into the internal combustion engine 12. When the throttle 38 is closed, such as by a driver removing their foot from the accelerator of a vehicle, the compressed air within the duct system 34 needs to be removed. The compressed air is not needed in this instance because the closed throttle 38 means that the excessive power (which the compressed air in the duct system 34 could provide) is not desired by the driver. Further, in some cases, allowing compressed air to remain within the duct system 34 can be problematic. The duct system 34 may therefore include a blowoff valve 40 configured to release the excess air upon the throttle 38 closing. In some embodiments, the blowoff valve 40 is in fluid communication with the engine manifold 36 such that a vacuum within the engine manifold 36 will open the blowoff valve 40 and allow the excess air to escape into the surrounding environment.

It should be understood that, in some embodiments, the supercharger system 10 may be integrated into a variety of other types of systems. For example, reference numeral 32 generally refers to a power source, which may be the internal combustion engine 12, as shown, or may be any other type of power source, such as an electric motor, hydraulic motor, pneumatic motor, or other suitable means for providing power. In some embodiments, the power received from the power source 32 may be received as, or converted into, rotational power within any of a variety of types of rotational systems.

Figure 2:
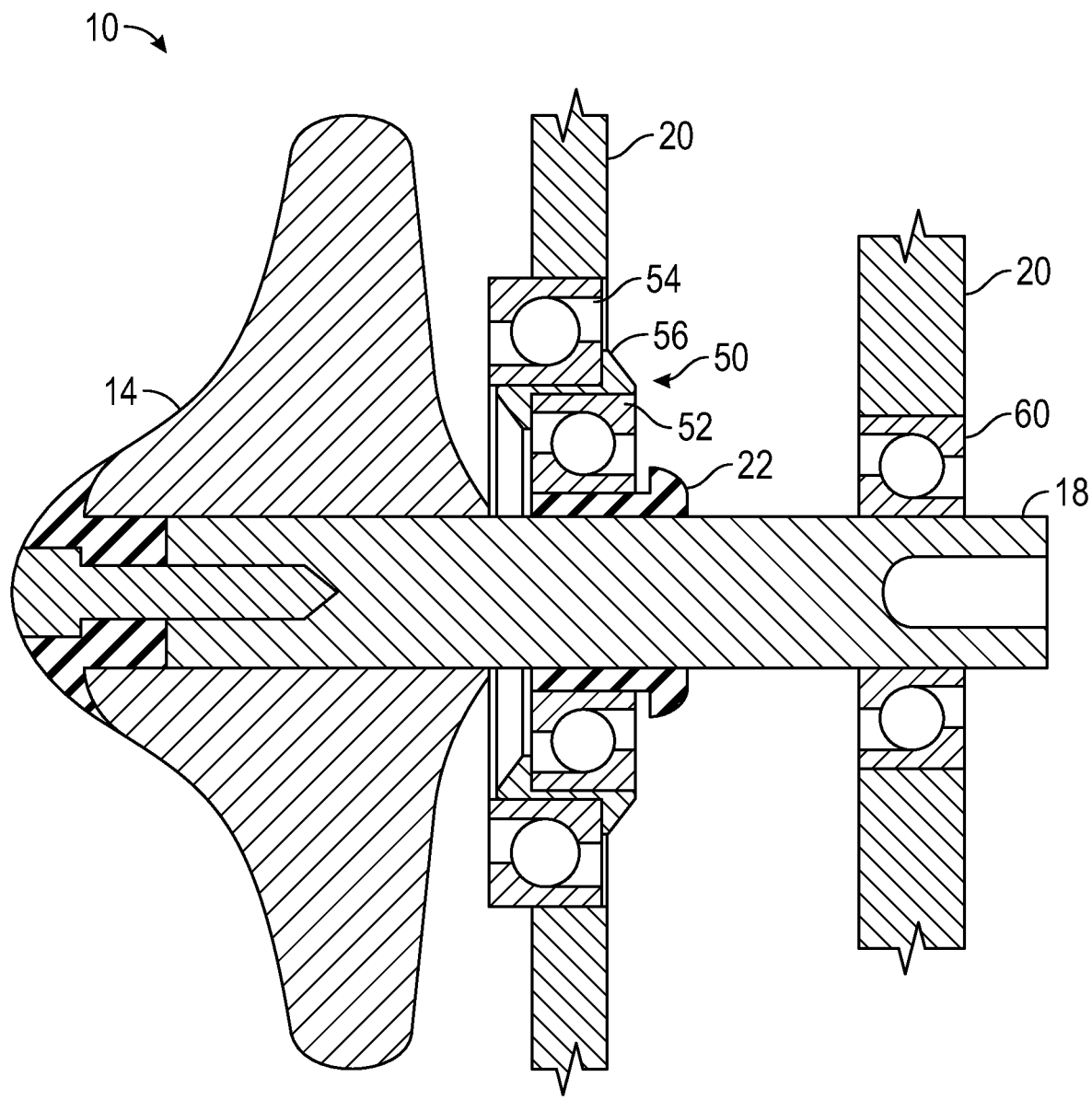
FIG. 2 depicts an internal view of a cross-section of a supercharger system relating to some embodiments of the invention.

Turning now to FIG. 2, an internal view of a cross-section of the supercharger system 10 is depicted relating to some embodiments of the invention. Here, the supercharger system 10 comprises the impeller 14 mounted onto a drive shaft 18, as shown. In some embodiments, the supercharger system 10 further comprises a frame 20, as shown, which may be fixed with respect to the compressor housing 16. Alternatively, in some embodiments, the frame 20 may be included as part of the compressor housing 16. In some embodiments, a compound bearing assembly 50 may be included, as shown, for supporting the drive shaft 18 within the supercharger system 10.

In some embodiments, the compound bearing assembly 50 comprises an inner bearing 52, an outer bearing 54, and an offset coupler 56 disposed between the inner bearing 52 and the outer bearing 54. In some embodiments, the inner bearing 52 and the outer bearing 54 are configured to, at least indirectly, support the drive shaft 18 and provide smooth rotation to the drive shaft 18 by reducing friction. In some embodiments, the offset coupler 56 is coupled to and supports each of the inner bearing 52 and the outer bearing 54. Accordingly, the offset coupler 56 may position each of the inner bearing 52 and the outer bearing 54 such that they are offset from one another, as can be seen in FIG. 2. As such, a loading on the compound bearing assembly 50 may be distributed between the inner bearing 52 and the outer bearing 54.

In some embodiments, a shaft sleeve 22 may be included, which may be used to couple the inner bearing 52 to the drive shaft 18, as shown. Accordingly, an inner surface of the shaft sleeve 22 may be adjacent to and/or fixed to an outer surface of the drive shaft 18 while an outer surface of the shaft sleeve 22 is adjacent to and/or coupled to an inner surface of the inner bearing 52. Alternatively, in some embodiments, the inner bearing 52 may be directly adjacent and/or coupled to the drive shaft 18. In some embodiments, an outer surface of the inner bearing 52 may be adjacent to and/or fixed to the offset coupler 56 and an inner surface of the outer bearing 54 may be adjacent to and/or fixed to the offset coupler 56, as shown. Further, in some embodiments, an outer surface of the outer bearing 54 may be adjacent to and/or fixed to the frame 20 of the supercharger system 10, as shown.

In some embodiments, an additional bearing 60 may be included and coupled to the drive shaft 18 at a distance spaced from the compound bearing assembly 50, as shown. However, it should be understood that, in some embodiments, any number of additional bearings may be included. Further, in some embodiments, the additional bearing 60 may be replaced with an additional compound bearing assembly, such that a plurality of compound bearing assemblies 50 may be included. In some embodiments, the compound bearing assembly 50 is configured to support a high-speed rotational load such that an overall rotational speed of the drive shaft 18 can exceed an individual limit of either of the bearings alone without risking increased wear or failure of the drive shaft 18, such as experienced during operation of the supercharger system 10. Accordingly, the offset positioning of the inner bearing 52 and the outer bearing 54 facilitated by the offset coupler 56 distributes the axial load of the drive shaft 18 caused by the rotation of the impeller 14. In some embodiments, the compound bearing assembly 50, as described herein, may be provided within other types of rotational systems besides the supercharger system 10 shown in FIG. 2.

Figure 3:
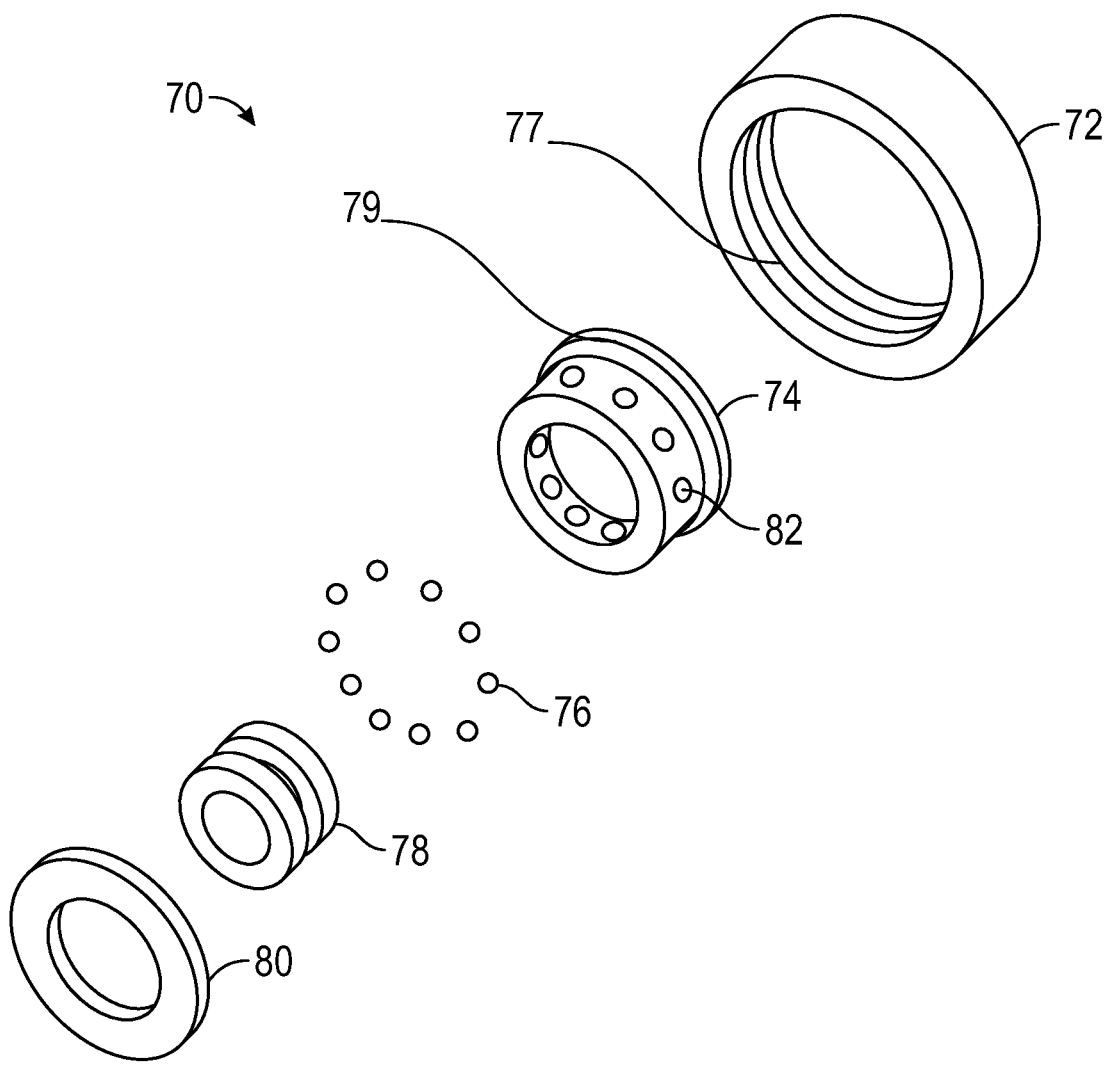
FIG. 3 depicts an exploded view of an exemplary bearing assembly relating to some embodiments of the invention.

Turning now to FIG. 3, an exploded view of an exemplary bearing assembly 70 is depicted relating to some embodiments of the invention. In some embodiments, the bearing assembly 70 comprises an outer race 72, a cage 74, a plurality of balls 76, an inner race 78, and one or more shields 80 or seals. In some embodiments, the outer race 72 and the inner race 78 form a bearing housing of the bearing assembly 70. Accordingly, the cage 74 may be disposed within the bearing housing between the inner race 78 and the outer race 72. In some embodiments, the cage 74 comprises a plurality of openings 82 for receiving the plurality of balls 76 therein, positioned along the edge of the cage 74. In some embodiments, at least some of the openings 82 may be circular, elliptical, or otherwise elongated. In some embodiments, at least some of the plurality of openings 82 may be elongated such that at least one dimension thereof is at least slightly larger than the diameter of the balls 76. Accordingly, in some embodiments, the elongated shape of the plurality of openings 82 of the cage 74 provide space between the plurality of balls 76 for oil to flow within the bearing assembly 70.

In some embodiments, at least one of the inner race 78 and the outer race 72 may be grooved for receiving the plurality of balls 76 such that the balls are able to roll within the grooves. Accordingly, in some embodiments, the inner race 78 may include a groove 79 along an outer surface of the inner race 78 and the outer race 72 may include a groove 77 along an inner surface of the outer race 72. In some embodiments, said grooves 77, 79 may be rounded for receiving the plurality of balls 76 such that the balls are able to roll freely within the bearing assembly 70. In some embodiments, the grooves 77, 79 further provide additional space for receiving lubricating oil within the bearing assembly 70 which further reduces friction.

In some embodiments, the plurality of balls 76 may comprise a plurality of high-speed ceramic balls for withstanding a speed and load associated with the drive shaft 18. Accordingly, the high-speed ceramic balls may comprise a ceramic material, such as silicon, silicon nitride or combinations thereof, which is relatively light weight but provides high strength and high-temperature resistance. In some embodiments, the lifetime of the balls is increased by using a light-weight ceramic material, as compared to the traditional steel balls which provide added mass that, in some cases, increases wear on other components of the bearing assembly. Additionally, in some embodiments, at least a portion of the cage 74 may comprise a titanium material which is also relatively light weight and provides high strength and high-temperature resistance. In some embodiments, the titanium material may include any of a variety of titanium alloys or substantially pure titanium. Further, embodiments are contemplated in which titanium may be used on at least a portion of the cage 74. For example, in some embodiments, the cage 74 may comprise a base material such as steel or another alloy which is coated along an outer surface with a titanium alloy to increase the strength and temperature resistance. It should be understood that, in some embodiments, other suitable materials not explicitly described herein may be used for either the cage 74 or the balls 76 such as other suitable high temperature, high-strength metal alloys, ceramics, composite materials, or combinations thereof.

Further, embodiments are contemplated in which both of the plurality of balls 76 and the cage 74 comprise a ceramic material for withstanding heat and providing increased strength. Alternatively, in some embodiments, each of the plurality of balls 76 and the cage 74 comprise a lightweight, high-temperature titanium material. Further still, in some embodiments, full ceramic bearings are contemplated in which each component of the bearing assembly 70 comprises the ceramic material. Alternatively, in some embodiments, a variety of different materials may be used. For example, the balls 76 may comprise a ceramic material while the cage 74 may comprise a titanium material and the remaining components such as the inner race 78 and the outer race 72 may comprise of heat-treated chrome or stainless steel.

In some embodiments, the shield 80 may comprise a flat circular hollow disk configured to be placed on an outside edge of the bearing assembly 70 to protect the internal components of the bearing assembly 70 from the environment, and, in some embodiments, to seal the bearing assembly 70 to prevent leakage of a lubricating oil. In some embodiments, two or more shields 80 may be included with at least a first shield disposed on a first end of the bearing assembly 70 and a second shield disposed at a second end of the bearing assembly 70. In some embodiments, the shield 80 may be configured to be secured to the outer race 72 of the bearing assembly 70.

It should be understood that, in some embodiments, the bearing assembly 70, as described herein, may be included as a standalone system. For example, embodiments are contemplated in which a single bearing is used and a compound bearing assembly is not necessarily included. Accordingly, the single bearing may not include an offset coupler 56 for distributing a rotational and axial load but may still include the cage 74 having openings 82 that reduce heat and provide an oil flow path through the bearing assembly 70. In some embodiments, an elongated elliptical shape of the plurality of openings 82 provides additional clearance for the plurality of balls 76 to fit. The space provided through the additional clearance increases the efficiency of heat dissipation within the bearing assembly 70, which allows the plurality of balls 76, the cage 74, and the overall bearing assembly 70 to cool at a faster rate. Accordingly, the bearing assembly 70 can achieve much higher rotational speeds during operation without overheating than a traditional bearing can.

In some embodiments, a variety of different manufacturing techniques may be used to produce the components described above with respect to FIG. 3. In some embodiments, components may be manufactured subtractively using suitable machining techniques. Alternatively, in some embodiments, any or all components may be additively manufactured, for example, by using a 3D printing technique. In some embodiments, the manufacturing process used may be selected based on the specific materials of each component such that one or more manufacturing processes may be used. For example, in some embodiments, the cage 74 may be machined using a titanium alloy and the plurality of balls 76 may be produced via additive manufacturing.

Figure 4A:
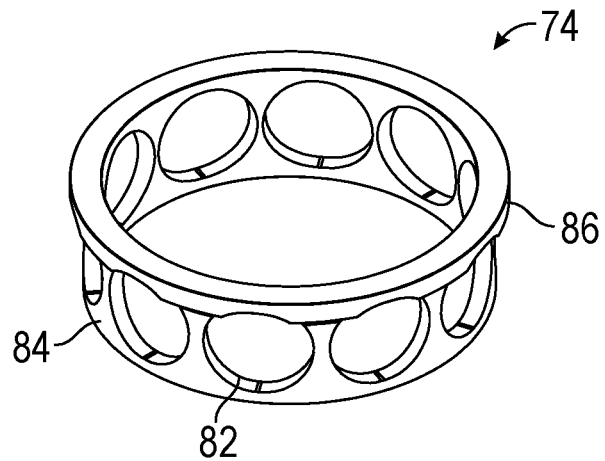
FIG. 4A depicts an isometric view of a bearing cage relating to some embodiments of the invention.

Turning now to FIG. 4A, an isometric view of the cage 74 is depicted relating to some embodiments of the invention. In some embodiments, the cage 74 comprises the plurality of openings 82, as described above with respect to FIG. 3. In some such embodiments, each of the openings 82 may be cut out of a wall section 84 of the cage 74. Further, in some embodiments, the cage 74 may comprise a lip section 86, as shown. In some embodiments, the lip section 86 may be disposed on a top side of the wall section 84. In some embodiments, two lip sections 86 may be included. For example, a top lip section and a bottom lip section. Alternatively, in some embodiments, the lip section 86 is not included.

Figure 4B:
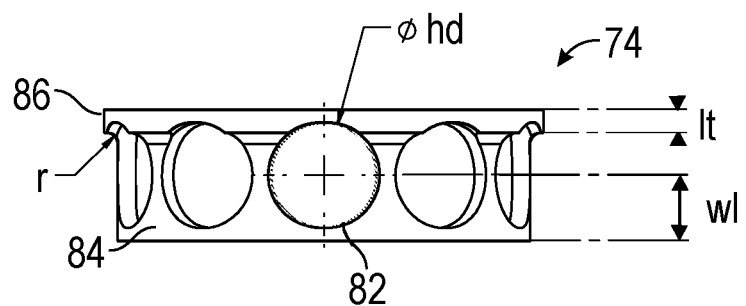
FIG. 4B depicts a side view of a bearing cage relating to some embodiments of the invention.

Turning now to FIG. 4B, a side view of the cage 74 is depicted relating to some embodiments of the invention. In some embodiments, each of the plurality of openings 82 comprises an elongated elliptical shape, as shown, instead of the traditional circular shape. In some embodiments, the elongated elliptical shape of the openings 82 provides a respectively larger clearance between the balls 76 and the cage 74, which allows additional oil flow through the cage 74. Additionally, the elongated elliptical shape of the openings 82 further provides space for cooling. In some embodiments, the elongated elliptical shape of the openings 82 reduces friction between the cage 74 and the balls 76 during operation, thereby reducing heat.

In some embodiments, a diameter, hd, of each of the plurality of openings 82 may be about 0.547 inches. In some embodiments, the diameter, hd, may be between about 0.5 inches to about 0.6 inches. In some embodiments, each of the plurality of openings 82 may be elongated about 1 degree from the center of the opening on each side. In some embodiments, a radius, r, of a rounded bottom edge of the lip section 86 is about 0.060 inches. In some embodiments, the radius, r, may be between about 0.05 inches and about 0.07 inches. Further, in some embodiments, a thickness, lt, of the lip section 86 may be about 0.122 inches. In some embodiments, the thickness, It, may be between about 0.1 inches and about 0.2 inches. In some embodiments, a distance, wl, from the center of the openings 82 to an edge of the wall section 84 is about 0.3435 inches. Accordingly, the total height of the cage 74 may be about 0.687 inches. In some embodiments, the distance, wl, may be between about 0.3 inches to about 0.4 inches.

Figure 4C:
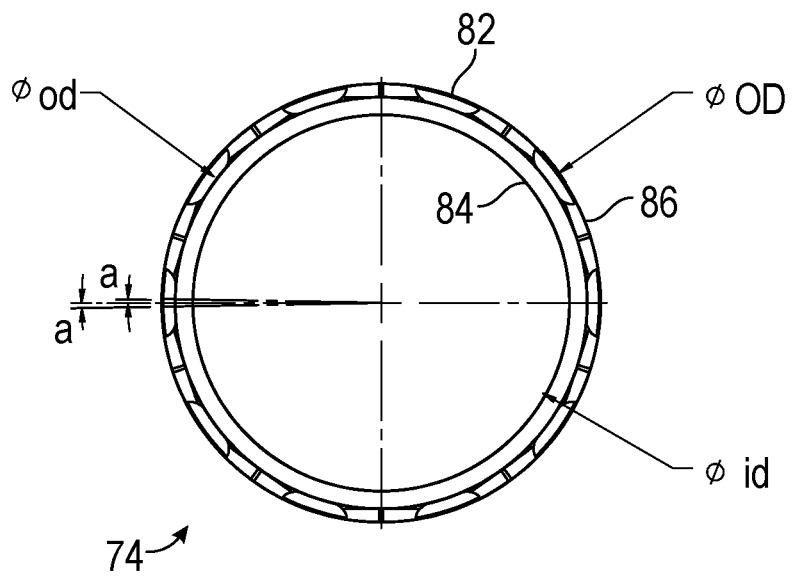
FIG. 4C depicts a bottom view of a bearing cage relating to some embodiments of the invention.

Turning now to FIG. 4C, a bottom view of the cage 74 is depicted relating to some embodiments of the invention. In some embodiments, an outer diameter, OD, of the lip section 86 is about 2.287 inches. In some embodiments, the outer diameter, OD, is between about 2 inches to about 2.5 inches. In some embodiments, an outer diameter, od, of the wall section 84 is about 2.147 inches and an inner diameter, id, of the wall section 84 is about 1.957 inches. In some embodiments, the outer diameter, od, may be between about 2 inches to about 2.25 inches. In some embodiments, the inner diameter, id, is between about 1.8 inches to about 2.2 inches. In some embodiments, an offset angle, a, of each of the plurality of openings 82 is about 1 degree on each side from the center of each openings 82. In some embodiments, the angle, a, may be between 0.5 degrees to about 1.5 degrees.

It should be understood that, in some embodiments, any of the dimensions denoted herein may be adjusted. Further, in some embodiments, tolerances may be included for each of the dimensions. For example, in some embodiments, a tolerance of about 0.030 inches may be included. Further still, in some embodiments, the cage 74, as described above, may be included within either of the inner bearing 52 or the outer bearing 54. In some embodiments, the cage 74 with similar dimensions as described herein may be included within the inner bearing 52. In some embodiments, a size of the cage 74 may be increased such that the cage 74 can be placed within the outer bearing 54. For example, in some embodiments, all dimensions of the cage 74 may be increased by a factor of two, such as for use within the outer bearing 54. Alternatively, in some embodiments, the cage 74 is only included within the inner bearing 52 and a distinctly different cage may be included within the outer bearing 54.

Turning now to FIG. 5A, a top view of the offset coupler 56 is depicted relating to some embodiments of the invention. In some embodiments, the offset coupler 56 comprises a central wall portion 90, which may include a thin cylindrical shape extending between an inner lip 92 and an outer lip 94 of the offset coupler 56, as shown. In some embodiments, when the compound bearing assembly 50 is assembled, the inner lip 92 of the offset coupler 56 supports the inner bearing 52 while the outer lip 94 supports the outer bearing 54.

In some embodiments, the inner lip 92 and the outer lip 94 may be positioned such that the inner bearing 52 and outer bearing 54 are offset. Here, in some embodiments, the offset coupler 56 distributes an axial load between the inner bearing 52 and the outer bearing 54. Specifically, each of the bearings 52 and 54 may be positioned off-center from one another such that the axial load is distributed equally, as opposed to a traditional compound bearing in which the bearings are positioned concentrically such that the inner bearing receives a majority of the axial load during operation. Accordingly, during operation, both of the inner bearing 52 and outer bearing 54 of the compound bearing assembly 50 are able to spin independently and the individual speed of the bearings 52, 54 may be less than the overall speed of the drive shaft 18. As such, the compound bearing assembly 50 is able to support relatively higher shaft speeds as compared to a traditional bearing assembly.

In some embodiments, the offset coupler 56 may be desirable for high-speed operations with relatively short run times, such as, operation of a supercharger impeller drive shaft. Here, operation of the supercharger may be restricted to short time operations when needed. However, the rotational speed of the impeller 14 and associated drive shaft 18 may exceed the speed ratings of typical bearing assemblies. In some cases, the rotational speed of the drive shaft 18 may be up to 50,000 or even 65,000 revolutions per minute. Accordingly, the offset coupler 56 allows the compound bearing assembly 50 to operate safely at high speeds such as would be present in a supercharger system or other high-speed, short operating time system.

In some embodiments, the shape of the offset coupler 56 also encourages additional oil flow within the compound bearing assembly 50 by providing an oil path from the inner bearing 52 to the outer bearing 54, or vice versa. Specifically, by offsetting each of the bearings 52 and 54, additional space is created which provides an oil path such that an oil, coolant, or other lubricant, is able to flow between the bearings 52, 54. For example, in some embodiments, a coolant fluid may be included for reducing heat within the compound bearing assembly 50. In some embodiments, an oil-based lubricant may be included for reducing friction within the compound bearing assembly 50. Further, in some embodiments, an oil or other fluid may be included that acts as both a lubricant and a heat transfer fluid for cooling the components of the compound bearing assembly 50.

Turning now to FIG. 5B, a cross-sectional view of the offset coupler 56 at a Section A-A, as denoted in FIG. 5A, is depicted relating to some embodiments of the invention. In some embodiments, the inner lip 92 and the outer lip 94 may be disposed at the ends of the central wall portion 90. For example, the inner lip 92 may be disposed at a first end of the central wall portion 90 extending inwards and the outer lip 94 may be disposed at a second end of the central wall portion 90 extending outwards, as shown. In some embodiments, the inner lip 92 is positioned to mate up to a side of the inner bearing 52. Accordingly, in some embodiments, when assembled, the inner bearing 52 may be disposed within the offset coupler 56 such that the inner bearing 52 is mated to the inner lip 92. Similarly, the outer lip is positioned to mate up to a side of the outer bearing 54. Accordingly, during assembly, the outer bearing 54 may be placed around the offset coupler 56 such that the outer bearing 54 is mated to the outer lip 94 of the offset coupler 56.

In some embodiments, each of the inner bearing 52 and the outer bearing 54 may be sized to fit the offset coupler 56, or vice versa. For example, the offset coupler 56 may be sized such that the inner bearing 52 fits within an inner surface of the central wall portion 90 of the offset coupler 56 and the outer bearing 54 fits around an outside surface of the central wall portion 90. In some embodiments, the offset coupler 56 may be designed for an interference fit with each of the inner bearing 52 and the outer bearing 54. Accordingly, embodiments are contemplated in which the bearings may be press fit onto the offset coupler 56.

Figure 6:
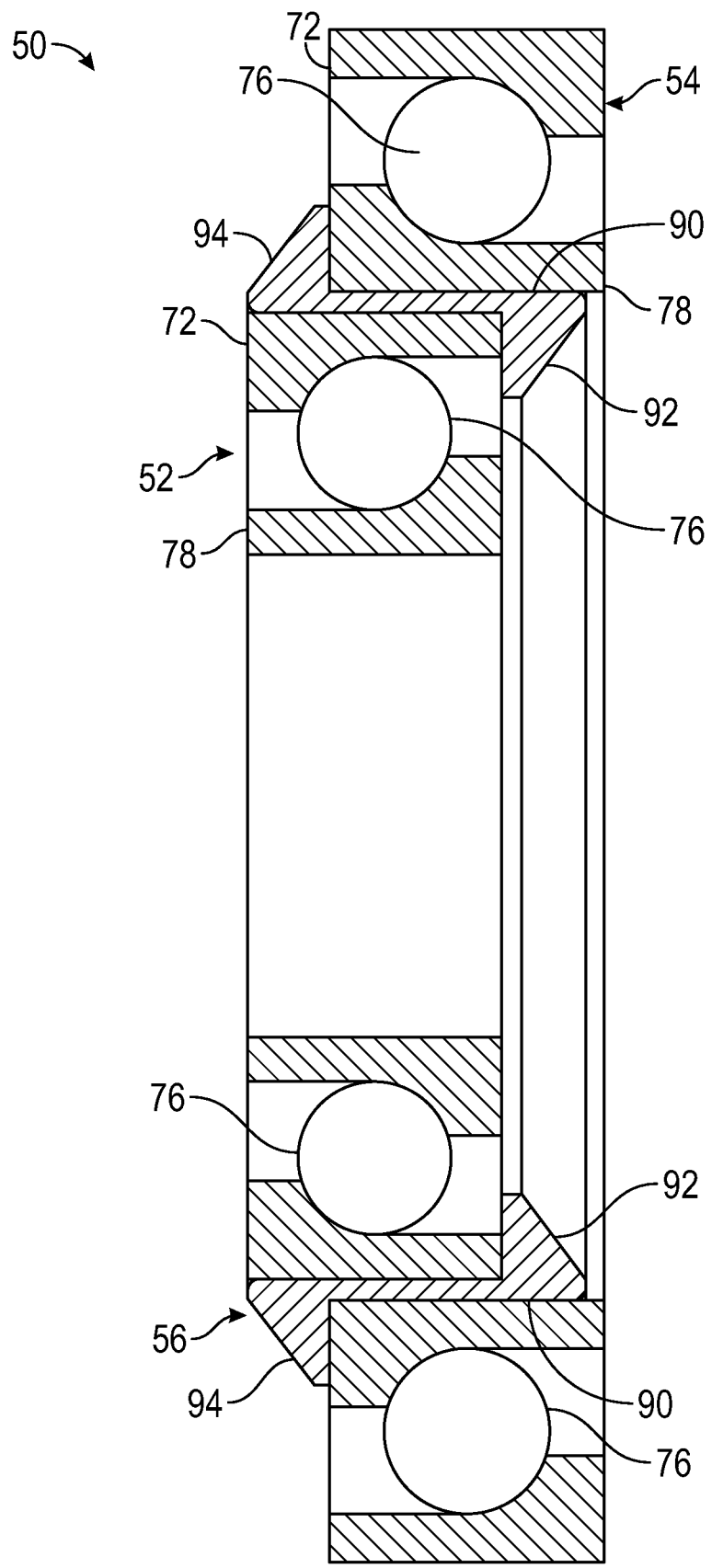
FIG. 6 depicts a cross-sectional view of a compound bearing assembly relating to some embodiments of the invention.

Turning now to FIG. 6, a cross-sectional view of the compound bearing assembly 50 is depicted relating to some embodiments of the invention. In some embodiments, the compound bearing assembly 50 comprises the inner bearing 52, the outer bearing 54, and the offset coupler 56, as shown. In some embodiments, each of the inner bearing 52 and the outer bearing 54 may comprise an outer race 72, an inner race 78, and a plurality of balls 76, as described with respect to FIG. 3. Further, in some embodiments, either or both of the inner bearing 52 and the outer bearing 54 further comprise the cage 74 including a plurality of openings 82. For example, in some embodiments, the cage 74 with the plurality of elongated elliptical openings 82 is only included within the inner bearing 52. Alternatively, in some embodiments, the cage 74 with the plurality of elongated elliptical openings 82 is included in both the inner bearing 52 and the outer bearing 54. Further still, embodiments are contemplated in which only the outer bearing 54 includes the cage 74 and the outer bearing 54 comprises a different type of cage including openings that are not elongated and/or elliptical.

In some embodiments, the offset coupler 56 couples the inner bearing 52 and the outer bearing 54 within the compound bearing assembly 50. Here, the inner bearing 52 may be supported by the offset coupler 56 such that a side of the inner bearing 52 abuts the inner lip 92 of the offset coupler 56. Similarly, the outer bearing 54 may be supported by the offset coupler 56 such that a side of the outer bearing 54 abuts the outer lip 94 of the offset coupler 56. In some embodiments, the outer race 72 of the inner bearing 52 is coupled to the offset coupler 56 at the inner lip 92 and the inner race 78 of the outer bearing is coupled to the offset coupler 56 at the outer lip 94, as shown.

Figure 7:
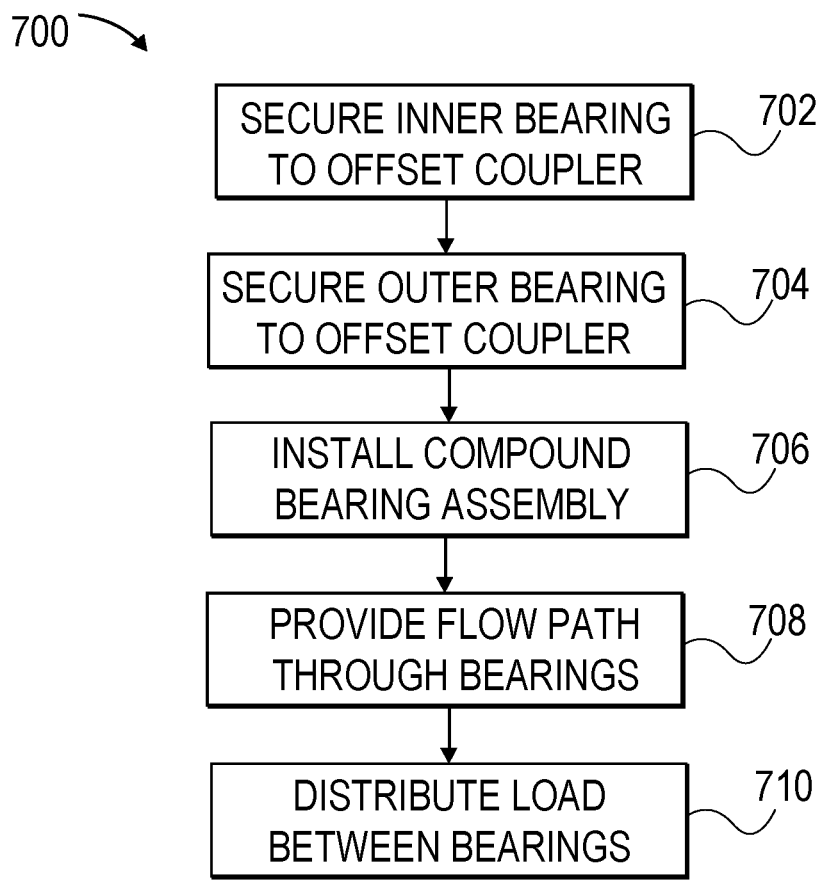
FIG. 7 depicts an exemplary method for providing and using a compound bearing assembly relating to some embodiments of the invention.

Turning now to FIG. 7, an exemplary method 700 for providing and using the compound bearing assembly 50 is depicted relating to some embodiments of the invention. At step 702, the inner bearing 52 is secured to the offset coupler 56. In some embodiments, the inner bearing 52 may be supported by the inner lip 92 of the offset coupler 56. In some embodiments, a variety of different joining processes may be used to secure the inner bearing 52 to the offset coupler 56. For example, in some embodiments, the inner bearing 52 may be press fit into the offset coupler 56. Alternatively, in some embodiments, the inner bearing 52 may be secured to the offset coupler 56 using one or more fastener means or a suitable adhesive.

At step 704, the outer bearing 54 is secured to the offset coupler 56. In some embodiments, the outer bearing 54 may be secured to the offset coupler 56 using any of the joining techniques described above with respect to step 702. At step 706, the compound bearing assembly 50 may be installed within a rotational system such as the supercharger system 10, as shown in FIG. 2. Alternatively, in some embodiments, the compound bearing assembly 50 may be installed in a variety of different environments and types of rotational systems. For example, embodiments are contemplated in which the compound bearing assembly 50 may be disposed on another drive shaft of a vehicle or on a drive shaft of a generator, turbine, or some other rotationally powered system.

At step 708, a flow path is provided through the compound bearing assembly 50 by offset coupler 56 and the openings 82. In some embodiments, the flow path allows a lubricating oil to flow between the inner bearing 52 and the outer bearing 54. In some embodiments, the shape of the offset coupler 56 provides additional space for which the oil can flow. At step 710, a load is distributed between the inner bearing 52 and the outer bearing 54 facilitated by the offset coupler 56. In some embodiments, the load is distributed equally such that each of the inner bearing 52 and the outer bearing 54 receive a similar portion of the overall load. In some embodiments, the load may be associated with an operation of the rotational system such as rotation of drive shaft 18.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A compound bearing assembly for supporting a drive shaft within a vehicle supercharger system, said drive shaft extending along a longitudinal axis, the compound bearing assembly comprising:
   an inner bearing surrounding the drive shaft, the inner bearing comprising:
      an inner bearing inner race;
      an inner bearing outer race surrounding the inner bearing outer race;
      an inner bearing cage comprising a plurality of elongated openings for allowing oil flow within the inner bearing; and
      a plurality of inner bearing balls disposed within the respective plurality of elongated openings of the inner bearing cage;
   an outer bearing comprising:
      an outer bearing inner race;
      an outer bearing outer race adapted to be coupled to a frame of the vehicle supercharger system;
      an outer bearing cage; and
      a plurality of outer bearing balls disposed within the outer bearing cage; and
   an offset coupler coupled to each of the inner bearing and the outer bearing, the offset coupler supporting the inner bearing outer race and the outer bearing inner race,
   wherein the offset coupler positions the inner bearing and the outer bearing such that the outer bearing is offset along the longitudinal axis with respect to the inner bearing to distribute a load from the drive shaft and to provide an oil flow path between the inner bearing and the outer bearing.

2. The compound bearing assembly of claim 1, wherein the plurality of inner bearing balls comprises ceramic.

3. The compound bearing assembly of claim 2, wherein the plurality of outer bearing balls comprises ceramic.

4. The compound bearing assembly of claim 1, wherein the inner bearing cage and the outer bearing cage comprise titanium.

5. The compound bearing assembly of claim 1, wherein the offset coupler comprises:
   an inner lip supporting the inner bearing; and
   an outer lip supporting the outer bearing.

6. The compound bearing assembly of claim 1, wherein each opening of the plurality of elongated openings is offset about 1 degree from a center of the respective opening.

7. The compound bearing assembly of claim 1, wherein the outer bearing cage comprises a plurality of elongated openings for receiving the plurality of outer bearing balls.

8. The compound bearing assembly of claim 1, wherein a rotational speed of each of the inner bearing and the outer bearing does not exceed an overall rotational speed of the drive shaft during operation.

9. A compound bearing assembly for supporting a drive shaft within a rotational system, the compound bearing assembly comprising:
   an inner bearing connected to the drive shaft, the inner bearing comprising:
      an inner bearing housing comprising an inner bearing inner race and an inner bearing outer race;

an inner bearing cage disposed within the inner bearing housing, the inner bearing cage including a plurality of elongated elliptical openings for allowing oil flow within the inner bearing; and a plurality of inner bearing balls disposed within the inner bearing cage;

an outer bearing comprising:

an outer bearing housing comprising an outer bearing inner race and an outer bearing outer race adapted to be coupled to a frame of the rotational system;

an outer bearing cage disposed within the outer bearing housing; and a plurality of outer bearing balls disposed within the outer bearing cage; and a coupler connecting the inner bearing to the outer bearing, the coupler secured to the inner bearing outer race and the outer bearing inner race, wherein the coupler provides an oil flow path between the inner bearing and the outer bearing.

10. The compound bearing assembly of claim 9, wherein the drive shaft extends along a longitudinal axis, and the coupler is an offset coupler for positioning the inner bearing and the outer bearing such that the outer bearing is spaced along the longitudinal axis with respect to the inner bearing to distribute an axial load from the drive shaft evenly.

11. The compound bearing assembly of claim 10, wherein the coupler comprises:

a cylindrical central wall portion;

an inner lip disposed at a first end of the central wall portion extending inwards for supporting the inner bearing; and an outer lip disposed at a second end of the central wall portion extending outwards for supporting the outer bearing.

12. The compound bearing assembly of claim 9, wherein the inner bearing cage and the outer bearing cage, or both comprise titanium.

13. The compound bearing assembly of claim 9, wherein the plurality of inner bearing balls and the plurality of outer bearing balls comprise ceramic.

14. The compound bearing assembly of claim 9, configured to be used at high-speed with the drive shaft of a supercharger system for a vehicle, wherein:

the plurality of inner bearing balls and the plurality of outer bearing balls each comprise ceramic, and the inner bearing cage and the outer bearing cage each comprise titanium.

15. A compound bearing assembly for supporting a drive shaft having a longitudinal axis within a rotational system, the compound bearing assembly comprising:

an inner bearing coupled to the drive shaft, the inner bearing comprising:

an inner bearing housing including an inner bearing inner race and an inner bearing outer race;

an outer bearing comprising:

an outer bearing housing including an outer bearing inner race and an outer bearing outer race configured to be coupled to a frame of the rotational system; and an offset coupler coupled to each of the inner bearing and the outer bearing, the offset coupler supporting the inner bearing outer race of the inner bearing and the outer bearing inner race of the outer bearing, wherein the offset coupler positions the inner bearing and the outer bearing such that the outer bearing is offset along the longitudinal axis with respect to the inner bearing to distribute a load from the drive shaft and to provide an oil flow path between the inner bearing and the outer bearing.

16. The compound bearing assembly of claim 15, wherein the inner bearing further comprises:

an inner bearing cage disposed within the inner bearing housing, the inner bearing cage including a plurality of elongated openings for allowing oil flow within the inner bearing; and a plurality of inner bearing balls disposed within the inner bearing cage.

17. The compound bearing assembly of claim 16, wherein the outer bearing further comprises:

an outer bearing cage disposed within the outer bearing housing, the outer bearing cage also comprising a plurality of elongated openings; and a plurality of outer bearing balls disposed within the outer bearing cage.

18. The compound bearing assembly of claim 17, wherein the inner bearing cage and the outer bearing cage comprise titanium.

19. The compound bearing assembly of claim 17, wherein the plurality of inner bearing balls and the plurality of outer bearing balls comprise ceramic that is configured for high-speed use.

20. The compound bearing assembly of claim 17, wherein each opening of the plurality of elongated openings of the inner bearing cage and the outer bearing cage is offset about 1 degree from a center of the respective opening.

* * * * *